United States Patent [19]
Maue

[11] Patent Number: 6,126,132
[45] Date of Patent: Oct. 3, 2000

[54] MULTI-FUNCTION SINGLE MOTOR SEAT TRACK ACTUATOR ASSEMBLY

[75] Inventor: H. Winston Maue, Farmington Hills, Mich.

[73] Assignee: Lear Automotive Dearborn, Inc., Southfield, Mich.

[21] Appl. No.: 09/139,003

[22] Filed: Aug. 24, 1998

Related U.S. Application Data

[63] Continuation-in-part of application No. 08/986,856, Dec. 8, 1997, which is a continuation of application No. 08/431,148, Apr. 28, 1995, Pat. No. 5,694,812.

[51] Int. Cl.[7] .................................................. F16M 13/00
[52] U.S. Cl. .......................................... 248/429; 248/588
[58] Field of Search ..................................... 248/429, 430, 248/588, 394, 424, 550; 74/665 F, 665 GB, 665 GD, 89.13, 89.14

[56] References Cited

U.S. PATENT DOCUMENTS

| | | |
|---|---|---|
| 3,365,163 | 1/1968 | Pickles . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,688,332 | 9/1972 | Bellware . |
| 4,470,318 | 9/1984 | Cremer et al. .......................... 74/353 |
| 4,645,159 | 2/1987 | Terada et al. . |
| 4,845,620 | 7/1989 | Parker . |
| 4,880,199 | 11/1989 | Harney . |
| 4,941,641 | 7/1990 | Granzow et al. ...................... 248/588 |
| 5,014,958 | 5/1991 | Harney . |
| 5,045,741 | 9/1991 | Dvorsky . |
| 5,050,922 | 9/1991 | Falcoff . |
| 5,110,091 | 5/1992 | Engel et al. . |
| 5,197,007 | 3/1993 | Parker . |
| 5,251,864 | 10/1993 | Itou ....................................... 248/588 |
| 5,346,170 | 9/1994 | Schmidt et al. . |
| 5,349,878 | 9/1994 | White et al. .......................... 74/89.14 |
| 5,356,117 | 10/1994 | Engel . |
| 5,427,345 | 6/1995 | Yamakami et al. ..................... 248/394 |
| 5,462,337 | 10/1995 | Yamakami ......................... 297/344.13 |
| 5,483,853 | 1/1996 | Moradell et al. ................... 74/665 GD |
| 5,528,959 | 6/1996 | Yamakami ......................... 74/665 GD |
| 5,694,812 | 12/1997 | Maue et al. . |
| 5,765,916 | 6/1998 | Patel . |
| 5,917,298 | 6/1999 | Miller ...................................... 318/444 |
| 5,927,679 | 7/1999 | Hill ......................................... 248/588 |

FOREIGN PATENT DOCUMENTS

| | | |
|---|---|---|
| 3807087 | 9/1989 | Germany . |
| 43 14 248 A1 | 9/1994 | Germany . |
| 2153218 | 1/1984 | United Kingdom . |

OTHER PUBLICATIONS

Ford Marketing Corporation, "1973 Car Shop Manual", Sep. 1972, vol. IV.

Karl E. Kist, "Designing for Intermittent Motion with Modified Starwheels" (prior to Apr. 1995).

S. B. Tuttle, "Motion, Circular, Intermittent", pp. 33–51 (prior to Apr. 1995).

Otto Lichtwitz, "Mechanism for Intermittent Motion", Jan. 1952, pp. 127–141.

Otto Lichtwitz, "Mechanisms for Intermittent Motion", Dec. 1951, pp. 134–148.

F. J. Bogardus, "A Survey of Intermittent–Motion" (prior to Apr. 1995).

(List continued on next page.)

*Primary Examiner*—Ramon O. Ramirez
*Assistant Examiner*—David Heisey
*Attorney, Agent, or Firm*—Macmillan, Sorbanski & Todd

[57] ABSTRACT

The preferred embodiment of a multi-functional apparatus employs a single electromagnetic device for selectively actuating at least two seat support movement mechanisms. In another aspect of the present invention, a single electric motor selectively actuates three movement mechanisms for a seat through three otherwise independent power transmission devices. Yet another aspect of the present invention employs an electronic control unit to automatically cause coupling of the electromagnetic device with the desired movement mechanism.

10 Claims, 8 Drawing Sheets

OTHER PUBLICATIONS

"The Geneva Mechanism" (prior to Apr. 1995).

H. Winston Maue, "Liftgate Multiplexed Node", Feb. 1996, 73–76.

Hamilton H. Mabie & Fred W. Ocvirk, "Mechanisms and Dynamics of Machinery", 1957, 32–36.

"Basics of Design Engineering", Machine Design –Jun. 1992, pp. 130, 132, 168.

G. F. Nordenholt, "Product Engineering", Oct. 1949, pp. 137–139.

J. E. Vandeman & J. R. Wood, "Modifying Starwheel Mechanisms" Machine Design –Apr. 1953, pp. 255–261.

Otto Lichtwitz, "Mechanisms For Intermittent Motion", Machine Design –Mar. 1952, pp. 147–155.

Otto Lichtwitz, "Mechanisms For Intermittent Motion", Machine Design –Feb. 1952, pp. 147–155.

Eight photographs of Automotive Seat Track using three motors, and a rack and pinion device (sold prior to Aug. 1998).

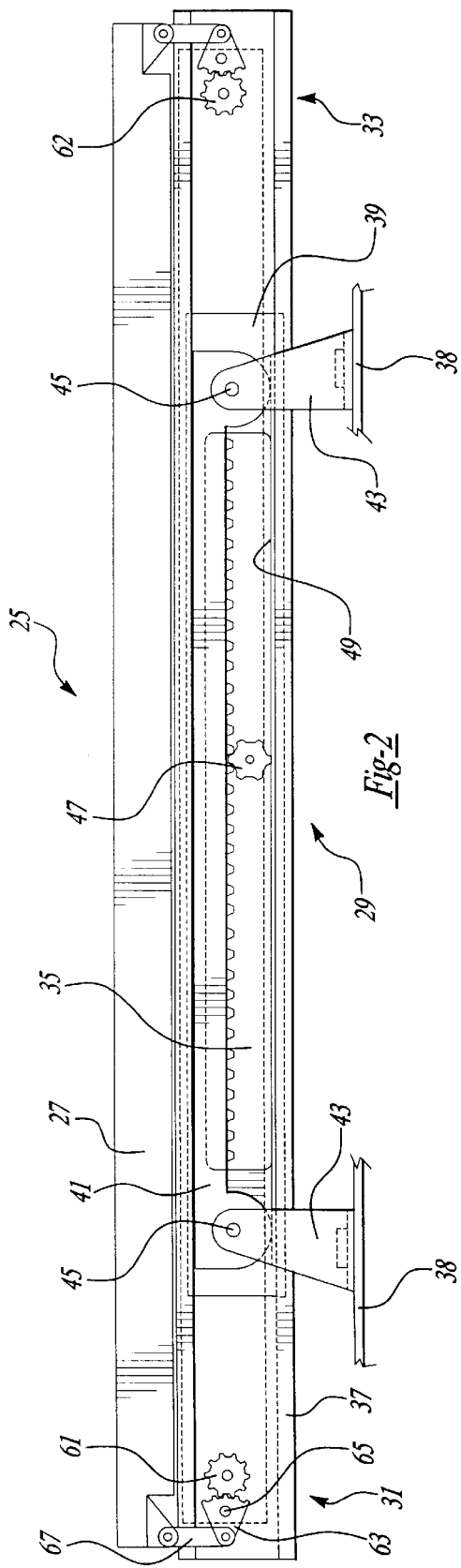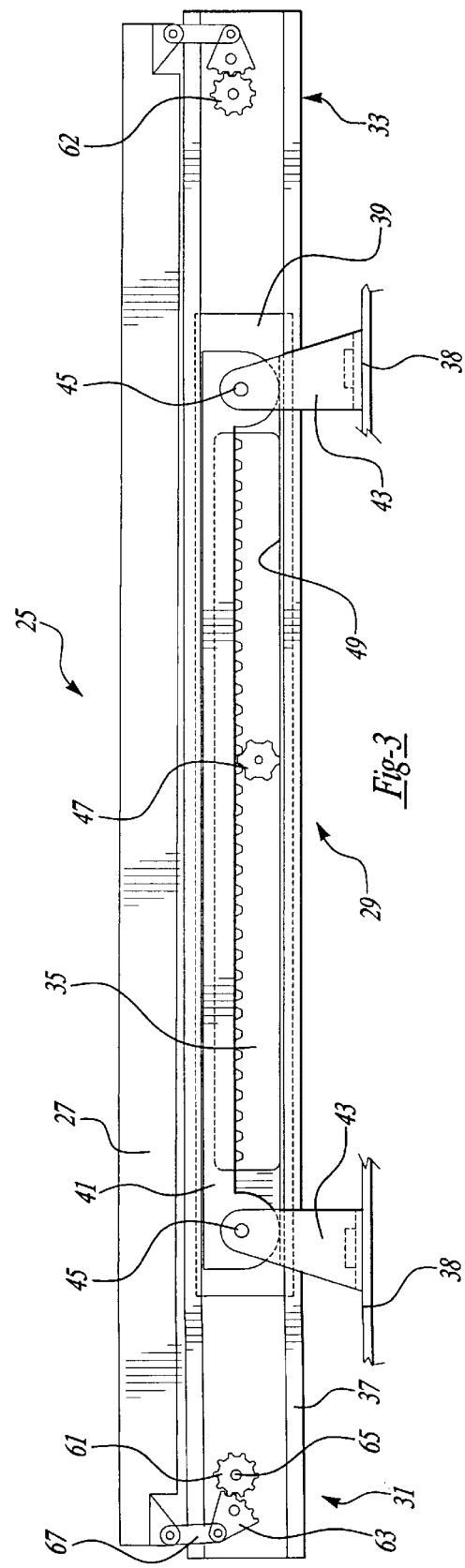

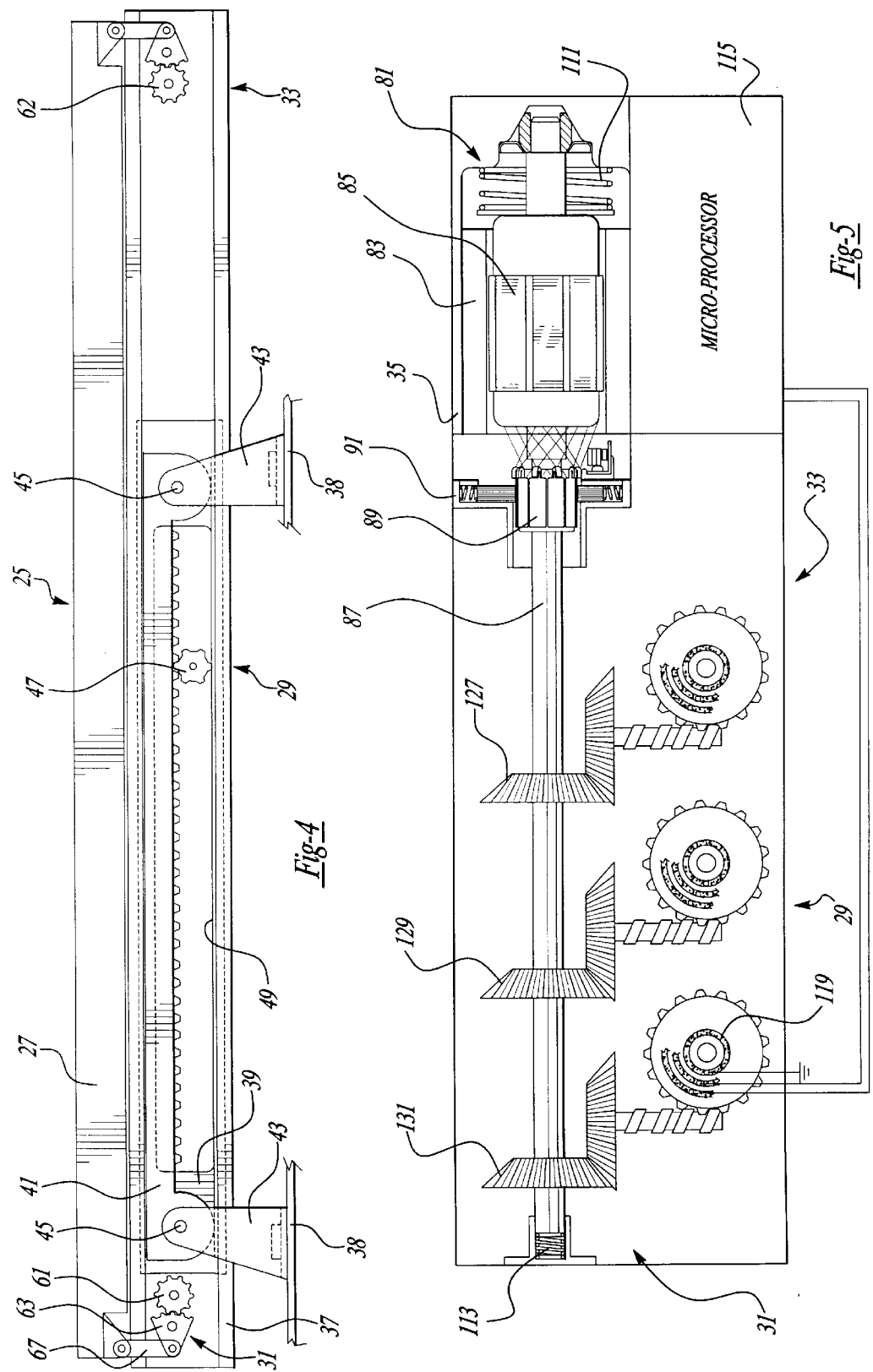

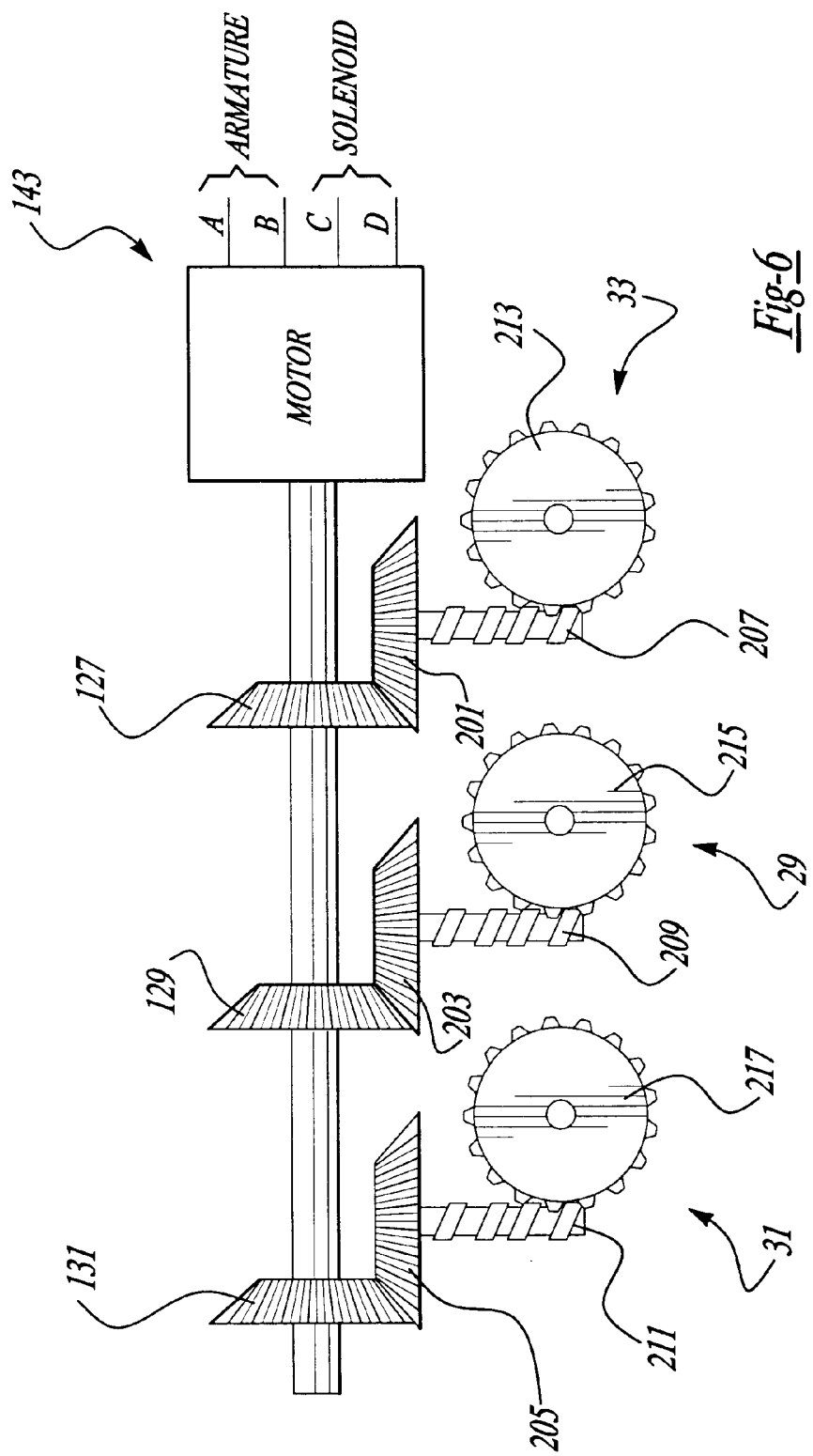

MULTI-FUNCTION SINGLE MOTOR SEAT TRACK ACTUATOR ASSEMBLY

CROSS REFERENCE TO RELATED APPLICATIONS

This application is a continuation-in-part of U.S. Ser. No. 08/986,856, filed Dec. 8, 1997, which is a continuation of U.S. Ser. No. 08/431,148, filed Apr. 28, 1995, now issued as U.S. Pat No. 5,694,812 on Dec. 9, 1997, which are incorporated by reference herewithin.

BACKGROUND OF THE INVENTION

This invention relates generally to multi-functional apparatuses and specifically to a multi-functional apparatus employing an electromagnetic device for use in an automotive vehicle seat.

Most conventional passenger seats in automotive vehicles employ three distinctly separate, electric motors for moving a seat in various directions. Typically, one electric motor controls fore and aft horizontal movement of the seat relative to a stationary vehicle floor pan. The fore and aft actuating electric motor commonly rotates a fore and aft oriented jackscrew or rotates a pinion gear meshed with a fore and aft oriented rack.

The second electric motor commonly rotates a crank or sector gear for upwardly or downwardly tilting a rear portion of the seat. Similarly, the third discrete electric motor causes upward or downward tilting of the front portion of the seat. Simultaneous upward movement of the second and third electric motors causes vertical rising, or conversely lowering, of the seat relative to the stationary floor pan. The three electric motors used in these traditional seat constructions are typically very heavy and costly. Examples of these types of conventional seat adjuster mechanisms are disclosed in the following U.S. Pat. No. 5,483,853 entitled "Systems for Adjusting Vehicle Seats" which issued to Moradell et al. on Jan. 16, 1996; U.S. Pat. No. 5,014,958 entitled "Powered Six-Way Seat Adjuster and Mechanisms Therefor" which issued to Harney on May 14, 1991; and U.S. Pat. No. 3,365,163 entitled "Seat Adjustment Mechanism" which issued to Pickles on Jan. 23, 1968; these patents are incorporated by reference herewithin.

It is also known to provide a scissor linkage for an air-sprung vehicle seat. For example, reference should be made to U.S. Pat. No. 4,941,641 entitled "Vehicle Seat" which issued to Granzow et al. on Jul. 17, 1990, which is also incorporated by reference herewithin.

Furthermore, various attempts have been made to integrate the electric motor for moving vehicle seats in various directions. For instance, United Kingdom Patent Application GB 2 153 218 A entitled "Seat with Multiple Adjustments Operable by an Electric Motor," which was published on Aug. 21, 1985, discloses multiple adjusting devices driven by a single electric motor when an output shaft of the motor is movably coupled with any one of several coupling heads; the electric motor is moved in a slide guide attached to the seat frame in a manual and non-automatic manner from one coupled position to another. Such a device appears to operate in a rather crude and unrefined manner by requiring the seat occupant to physically move the motor, thereby deterring use in a luxury vehicle where power seats are commonly used.

Another integrated approach is discussed in the following U.S. Pat. Nos. which issued to Yamakami; U.S. Pat. No. 5,528,959 entitled "Multi-Driving Assembly of Vehicle Power Seat" which issued on Jun. 25, 1996; U.S. Pat. No. 5,462,337 entitled "Power Seat Driving Apparatus for a Vehicle" which issued on Oct. 31, 1995; and U.S. Pat. No. 5,427,345 entitled "Apparatus for Driving Power Seat for Vehicle" which issued on Jun. 27, 1995. While these patents show a single motor for providing tilting and fore and aft adjustment, supplemental remotely located exciting coils are employed which act as clutches in the powertrain. Hence, three electromagnetic devices and their associated costs are still required with this construction.

SUMMARY OF THE INVENTION

In accordance with the present invention, the preferred embodiment of a multi-functional apparatus employs a single electromagnetic device for selectively actuating at least two seat support movement mechanisms. In another aspect of the present invention, a single electric motor selectively actuates three movement mechanisms for a seat through three otherwise independent power transmission devices. A further aspect of the present invention provides a rotatable member which is also linearly movable to differing positional ranges to selectively mechanically couple the electromagnetic device to the desired movement mechanism coinciding with each positional range. Yet another aspect of the present invention employs an electronic control unit to automatically cause coupling of the electromagnetic device with the desired movement mechanism.

The multi-functional apparatus of the present invention is advantageous over conventional systems since the present invention combines many different functions into a single apparatus. For example, the present invention multi-functional apparatus employs a single electromagnetic device per seat instead of the typical three distinctly housed electric motors or remote excited coil assemblies. Thus, the present invention essentially eliminates the cost and weight associated with two electric motors or clutching coil assemblies per seat. The packaging space for the present invention is also significantly smaller than traditional devices. Another advantage of an embodiment of the present invention is that the seat support can be vertically raised and lowered by use of a single power transmission device rather than the traditional use of two, remotely spaced, but simultaneously acting tilting gear sets. Additional advantages and features of the present invention will become apparent from the following description and appended claims, taken in conjunction with the accompanying drawings.

BRIEF DESCRIPTION OF THE DRAWINGS

FIGS. 2–4 are diagrammatic side views showing the preferred embodiment multi-functional apparatus in various positions;

FIG. 5 is a diagrammatic side view showing an electric motor and power transmission mechanisms employed in the preferred embodiment multi-functional apparatus;

FIG. 6 is a diagrammatic side view showing the electric motor and power transmission mechanisms employed in the preferred embodiment multi-functional apparatus;

DETAILED DESCRIPTION OF A PREFERRED EMBODIMENT

A luxury automotive vehicle has a pair of front occupant seats made of cloth, leather or vinyl covered foam with a stiff metal skeleton. As can be observed in FIG. 1, the seat includes a seat back 21, a seat bottom 23 and the multi-functional apparatus 25 of the present invention.

Figure 1:
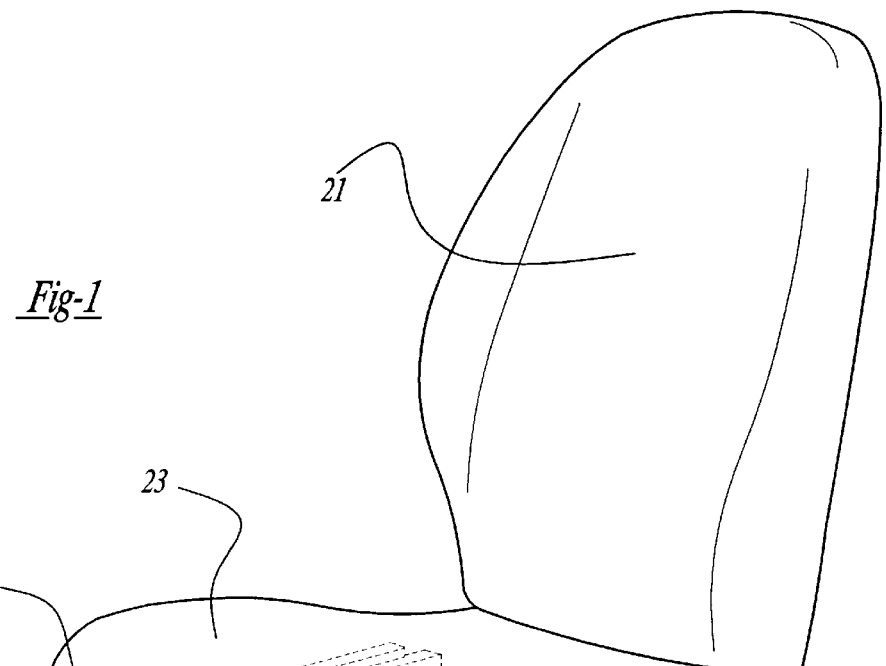
FIG. 1 is a perspective view showing a preferred embodiment of a multi-functional apparatus of the present invention mounted to an automotive vehicle seat.

Referring now to FIGS. 1 and 2, the preferred embodiment of multi-functional apparatus 25 includes a skeletal seat supporting structure or frame 27, three separate movement mechanisms 29, 31 and 33, an integrated motor and powertrain housing 35 and a pair of seat tracks 37. Each seat track 37 has an outwardly open C-shaped cross section and is longitudinally elongated in a horizontal, fore and aft direction. Seat tracks 37 are stamped from steel and move fore and aft in concert with seat bottom 23 and supporting structure 27.

A steel slide 39 is stationarily bolted to a floor pan 38 of the automotive vehicle via steel triangular brackets 43. Each respective track 37 fits about slide 39 for operably moving fore and aft relative to the stationary internal slide 39. A rack 41 of power transmission mechanism 29 is riveted or otherwise fastened to both slide 39 and brackets 43 at fastening points 45, on each side of the seat. A steel output pinion gear 47 of power transmission mechanism 29 extends outwardly through a circular hole in each track 37 and through an elongated slot 49 of each adjacent slide 39 for meshing with the corresponding rack 41. A steel, elongated shaft may be needed to couple pinion gear 47 on the opposite (non-motor) side of the seat with the remainder of power transmission mechanism 29. It is noteworthy that the flatness of each metallic rack is important to ensure proper performance. Thus, tracks 37 and steel seat supporting structure 27 are operably moved in a fore and aft direction by rotation of pinion gears 47, while pinion gears 47 and motor housing 35 remain stationary in a fore and aft direction. This fore and aft mechanism movement can best be observed by comparing the central position of FIG. 2 to the rearwardly moved position of FIG. 4.

Referring again to FIG. 2, upward and downward tilting movement of seat supporting structure 27 is provided by actuation of power transmission mechanisms 31 and/or 33. On only one side of the seat, an output pinion gear 61 operably drives a sector gear 63 about pivot point 65. Pivot point 65 is mounted to track 37. Rotation of sector gear 63 causes a tilting link 67 to push or pull the adjacent end of seat supporting structure 27 in a rotating or tilting manner relative to seat tracks 37 and floor pan 38. The tilting action has a vertical angular component and a horizontal angular component. Power transmission mechanism 33 operates in a manner similar to that discussed for power transmission mechanism 31. Power transmission mechanisms 31 and 33 are made from steel. Tilting links 67 and non-geared pivoting following links (similar in shape to sector gears 63) are provided on the other side (non-motor) of structure 27. The tilting movement can best be observed by comparing the horizontal seat supporting structure position of FIG. 2 with the upwardly tilted and rotated position of seat supporting structure 27 of FIG. 3.

Figure 7:
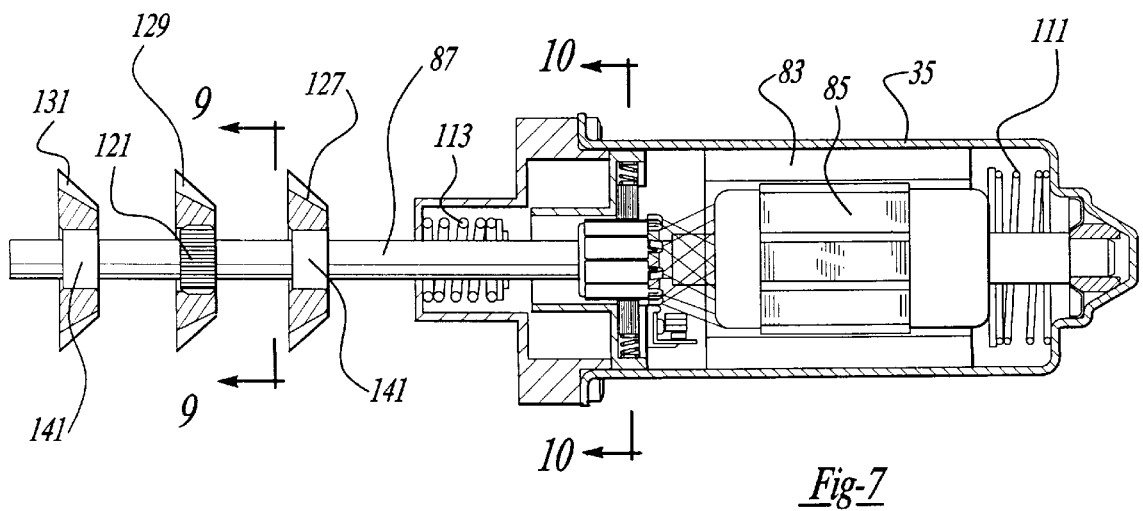
FIGS. 7 and 8 are side elevational views, taken partly in section, showing the electric motor and a portion of the power transmission mechanisms employed in the preferred embodiment multi-functional apparatus, but having a different return spring configuration than that of FIG. 5.

The three movement mechanisms are all actuated by use of a single electromagnetic device such as an electric motor 81. The preferred embodiment electric motor 81 and associated power transmission mechanisms are illustrated in FIGS. 5–10. Electric motor 81 is a fractional horsepower, direct current motor having a metallic or polymeric housing 35 within which are stationary permanent magnets 83, a rotatable armature 85 with wire windings, a rotatable armature shaft 87 joined to the armature, a commutator 89 electrically connected to the wire windings and rotatable with the armature shaft, a brush card assembly 91 and various electronic components. Brush card 91 includes four brush boxes 101, each having a metallic brush 103 biased toward commutator 89 by a compression spring 105. Two of the brushes 103, designated as A and B, provide armature rotation in clockwise and counterclockwise directions when energized. Another pair of brushes, designated as C and D, control linear movement of armature 85 and armature shaft 87 in a solenoid-action manner. Such a linearly moving and rotating motor is generically disclosed in U.S. Pat. No. 5,045,741 entitled "Dual-Motion Apparatus" which issued to Dvorsky on Sep. 3, 1991, and is incorporated by reference herewithin. Armature 85 and armature shaft 87 are normally biased toward a centered positional range, as shown in FIGS. 5 and 7, by way of a pair of compression springs 111 and 113. FIG. 7 shows a preferred compression spring arrangement while FIG. 5 shows an alternate compression spring arrangement. Housing 35 is affixed to one track 37.

A micro-processor type of electronic control unit 115 is preferably integrated into motor housing 35. Microprocessor 115 controls the linear and rotational positioning of armature 85 by selectively energizing the appropriate brushes 103 in response to occupant operation of one or more electrical switches 117 (see FIG. 1). A set of conductive feedback patterned discs or paths 119 are mounted onto portions of power transmission mechanisms 29, 31 and 33, such as the bevel gears or driven worm gears. Electrical wiping contactors ride along the feedback disc thereby indicating the rotational position of the gear, and indirectly the seat, to microprocessor 115. This is especially appropriate for use with a memory seat control system such as that disclosed in U.S. Pat. No. 5,765,916 entitled "Memory Seat with Soft and Hard Travel Limits" which issued to Patel on Jun. 16, 1998; U.S. Pat. No. 5,197,007 entitled "Control System for Vehicle Memory Seat Recall Positioning" which issued to Parker on Mar. 23, 1993, and U.S. Pat. No. 4,845,620 entitled "Control Arrangement for Vehicle Memory Seat" which issued to Parker on Jul. 4, 1989; these patents are incorporated by reference herewithin. It is further envisioned that microprocessor 115 can act as a multiplexed seat node when electrically connected to a central body computer in a multiplexed (MUX) fashion through a lower cost and smaller sized wire harness. A J8150 MUX protocol is used.

Linear movement of armature shaft 87 and an externally splined spur gear 121 fixedly mounted thereon act as a clutching intermittent motion mechanism to selectively couple and uncouple electric motor 81 and the desired one of the three movement mechanisms. Spur gear 121 has a set of splines 123 around an exterior peripheral surface for meshing with internal splines 125 of first bevel gears 127, 129 and 131. The leading and trailing ends of spur gear splines 123, facing toward and away from armature 85, and internal splines 125 of each bevel gear 131 are chamfered to encourage offset alignment and deter tooth butt conditions when spur gear 121 internally couples and meshes with the selected bevel gear. Circular-cylindrical and unsplined bearings 141 are also mounted on armature shaft 87.

In addition, to first bevel gears 127,129 and 131, power transmission mechanisms 29, 31 and 33 further include second bevel gears 201, 203 and 205 enmeshed with bevel gears 127, 129 and 131 respectively. Worm gear shaft segments 207, 209 and 211 centrally project from bevel gears 201, 203 and 205, respectively, for driving output worm gears 213, 215 and 217, respectively. Worm gears 213, 215 and 217 respectively drive output pinion gears 62, 47 and 61 through use of rigid coaxial shafts or flexible cables. It is advantageous to use worm gear segments or jackscrews in order to prevent back driving of the drive train and the electric motor thereby deterring undesired seat movement. Dynamic braking of the electric motor can also be used to deter powertrain back driving.

Figure 8:
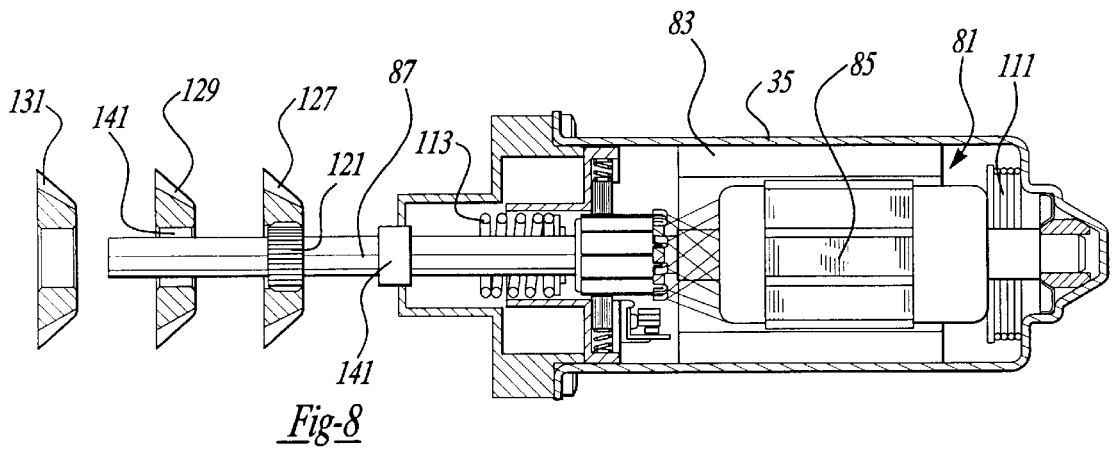
Figure 9:
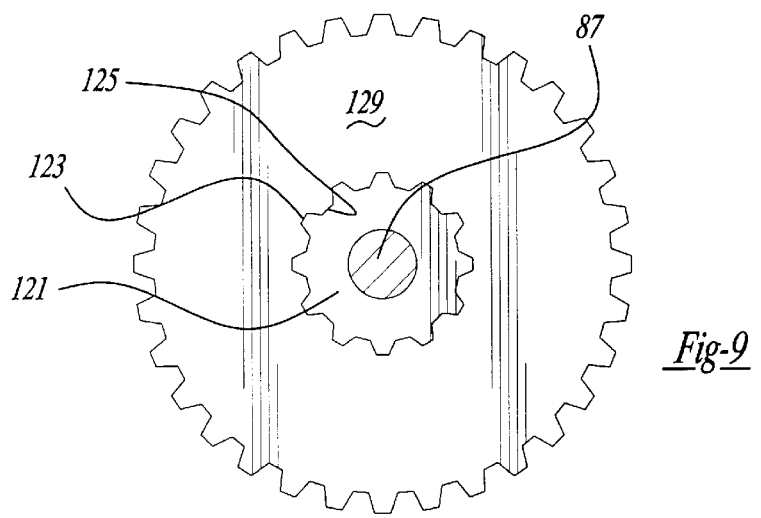
FIG. 9 is a cross sectional view, taken along line 9—9 of FIG. 7, showing a portion of a power transmission mechanism employed in the preferred embodiment multi-functional apparatus.
Figure 10:
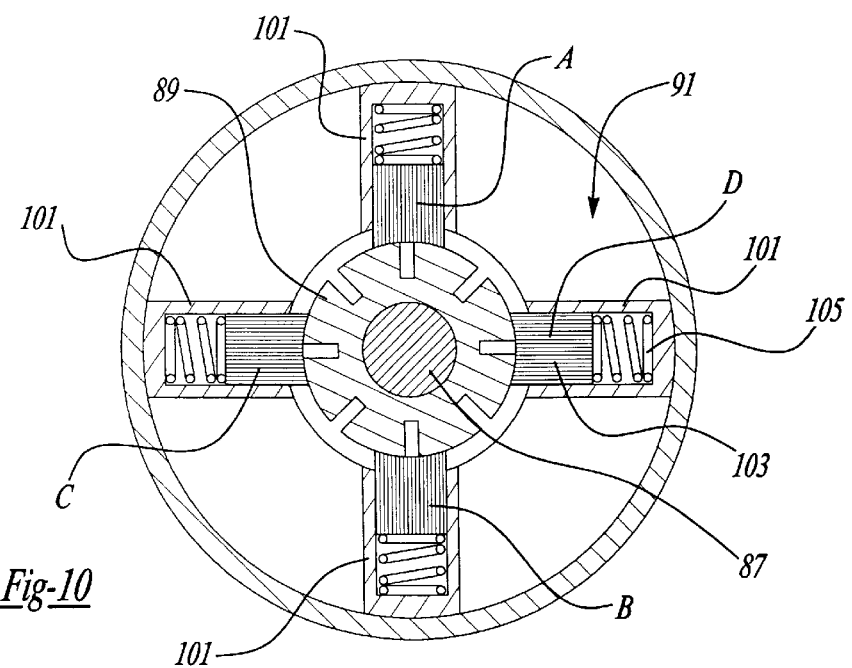
FIG. 10 is a cross sectional view, taken along line 10—10, showing the electric motor employed in the preferred embodiment multi-functional apparatus.

Accordingly, spur gear 121 mechanically couples rotation of armature 85 to central bevel gear 129 when armature shaft 87 is disposed in a central positional range as shown in FIG. 7. This occurs when the solenoid brushes C and D are deenergized and compression springs 111 and 113 centrally bias armature 85 and armature shaft 87 relative to stator 83. Furthermore, spur gear 121 is moved to a second positional range coinciding with bevel gear 127, as shown in FIG. 8, when solenoid brushes C and D are energized in a predetermined first polarity thereby causing armature 85 to linearly move as shown and compress spring 111 against an end of housing 35. Moreover, when microprocessor 115 reverses polarity of solenoid brushes C and D, armature 85 and armature shaft 87 will linearly move in an opposite direction from that shown in FIG. 8 in order to mechanically couple spur gear 121 with bevel gear 131 in a third positional range. Electric motor 81 is thereby automatically coupled to one of multiple power transmission mechanisms in a quick and refined manner without the need for additional costly excited coil-activated clutches remotely located away from the electric motor, and without the need for manual movement of the motor by the seat occupant. The seat occupant is entirely unaware of the linear movement of the electric motor. The electrical circuit 143 for brushes A–D are energized in accordance with Table 1 to correspond with the stated desired seat movements (where CW=clockwise and CCW=counterclockwise). Dynamic braking is achieved by electrically shunting together brushes A and B.

TABLE 1

| Seat Movement | Armature Movement | | Brush Actuation | | | |
| --- | --- | --- | --- | --- | --- | --- |
| | Rotational | Longitudinal | Motor | | Solenoid | |
| | | | A | B | C | D |
| Front Up | CW | Extreme Left | + | − | + | − |
| Front Down | CCW | Extreme Left | − | + | + | − |
| Braked | Stop | Extreme Left | 0 | 0 | 0 | 0 |
| Forward | CW | Centered | + | − | 0 | 0 |
| Rearward | CCW | Centered | − | + | 0 | 0 |
| Braked | Stop | Centered | 0 | 0 | 0 | 0 |
| Rear Up | CW | Extreme Right | + | − | − | + |
| Rear Down | CCW | Extreme Right | − | + | − | + |
| Braked | Stop | Extreme Right | 0 | 0 | 0 | 0 |

It is also envisioned that a push-push latching mechanism can alternately be used to secure armature 85 and armature shaft 87 in either or both extreme longitudinally moved positions. For example, one or more spring detents can be mounted to housing 35 for engaging a V-shaped and notched cam disposed on armature shaft 87, or vice versa, similar to the latching arrangement of U.S. Pat. No. 5,050,922 entitled "Overhead Console having a Pivotable Storage Shelf-Door" which issued to Falcoff on Sep. 24, 1991, and is incorporated by reference herewithin.

The preferred embodiment of the present invention advantageously employs a single electric motor to selectively and automatically actuate multiple seat movement mechanisms. The single electric motor per seat can provide generally horizontal fore and aft seat movement, front tilting movement, rear seat tilting movement and even vertical full seat movement (by quickly alternating the spur gear between the first and third tilting bevel gears).

Figure 11:
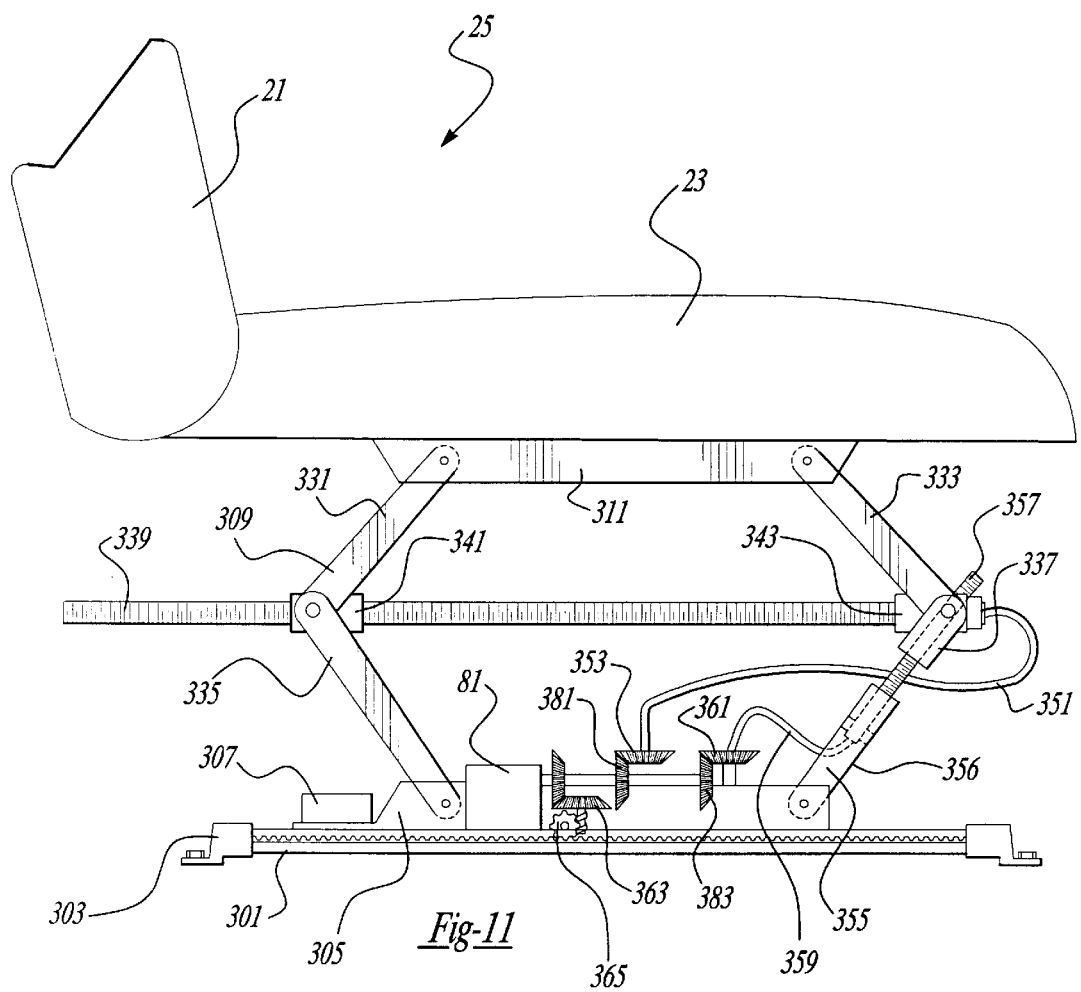
FIG. 11 is a fragmentary side elevational view showing an alternate embodiment of the multi-functional apparatus of the present invention mounted to an automotive vehicle seat.
Figure 12:
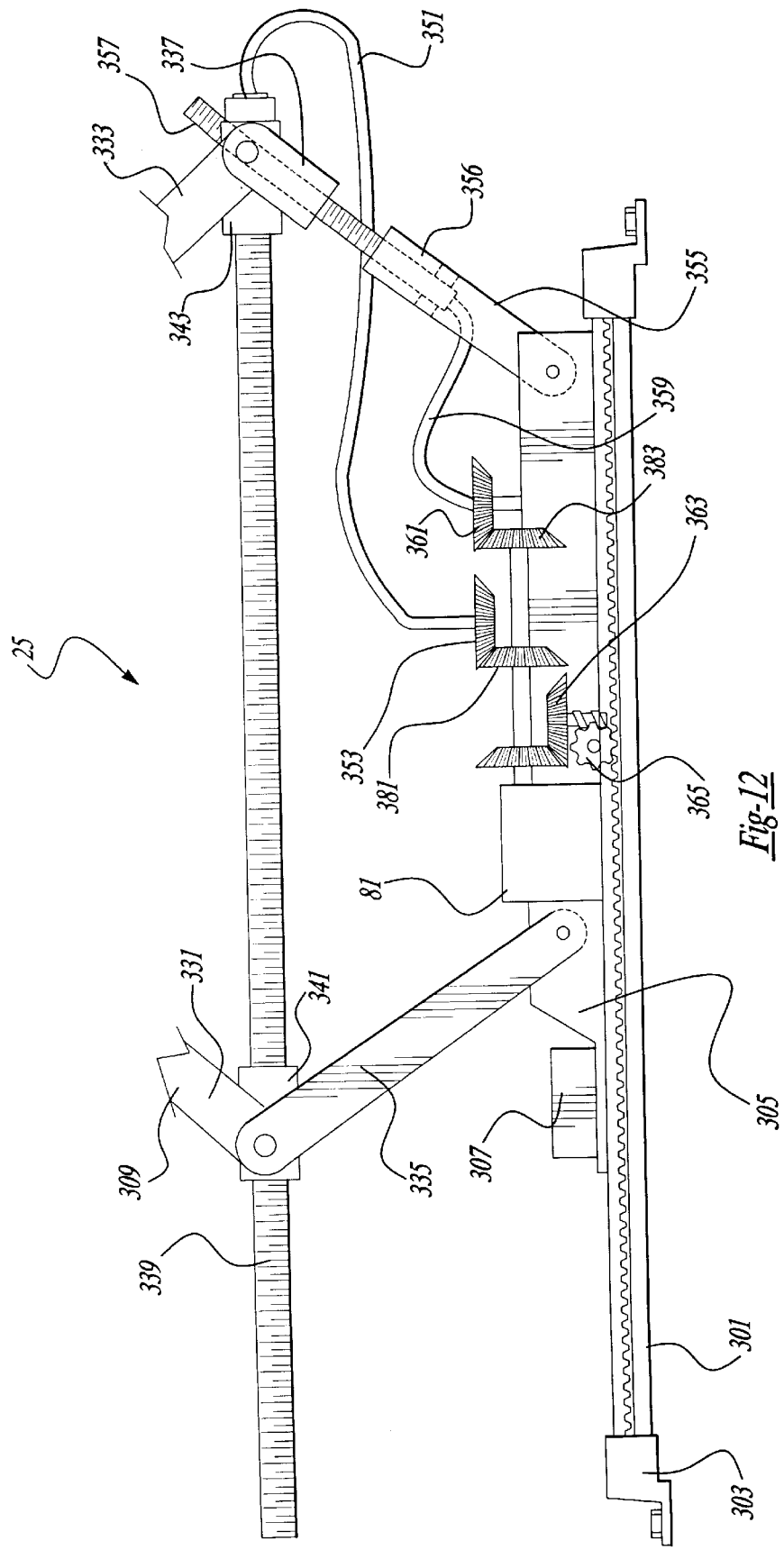
FIGS. 12 and 13 are enlarged and fragmentary side elevational views showing the alternate embodiment multi-functional apparatus in various positions.
Figure 13:
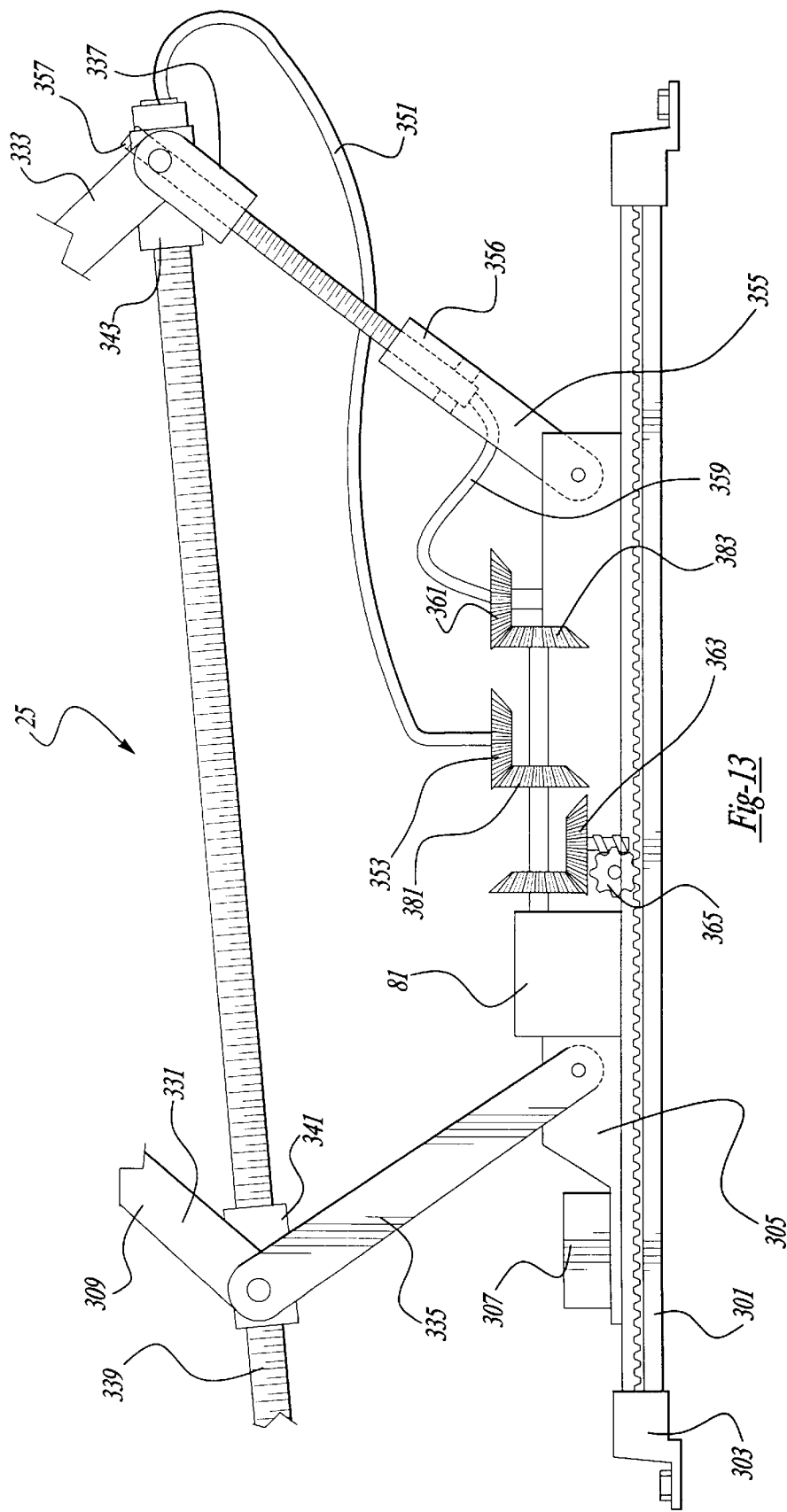

An alternate embodiment of the multi-functional apparatus 25 is illustrated in FIGS. 11–13. In this embodiment, a rack 301 is stationarily mounted to each stationary seat track 303. The electric motor 81 of the preferred embodiment is mounted to a base 305 which is operably movable in a fore and aft direction relative to seat tracks 303. A microprocessor 307, shown as a separately housed unit, (but could be integral with the motor) is also mounted to base 305 but is still electrically connected for controlling electric motor 81. A scissor-type linkage movement mechanism 309 movably couples a seat supporting structure 311 to base 305 on each side of seat bottom 23. Scissor-type linkage movement mechanism 309 includes a pair of upper links 331 and 333 pivotably coupled to a pair of lower links 335 and 337 by trunnions 341 and 343. A generally horizontally mounted jackscrew 339 mechanically couples trunnions 341 and 343 for one mechanism. Trunnions 341 and 343 can be constructed in the manner shown in U.S. Pat. No. 5,356,117 entitled "Hollow Trunnions for Scissor Jacks" which issued to Engel on Oct. 18, 1994, which is incorporated by reference herewithin. A flexible cable 351 has a first square cross sectionally shaped end mounted in an end of jackscrew 339 and also has a second square-shaped end mounted in a hub of a bevel gear 353.

A first part 355 of lower link 337 is coupled to a second part 356 of lower link 337 by way of another jackscrew 357. A first end of jackscrew 357 engages with trunnion 343 while a second and opposite end of jackscrew 357 is secured to a wall portion of link 355. A squared end of a second flexible cable 359 is affixed within the second end of jackscrew 357. An opposite squared end of flexible cable 359 is secured to a hub of a second bevel gear 361. Flexible cables 351 and 359 are made from spiral wound wire having a circular central cross sectional shape and stamped square ends; such flexible cables are suitable for rotationally transmitting force between gears while being longitudinally flexible and are believed to have been traditionally used for speedometers. A third bevel gear 363 and worm gear segment directly drive an output pinion gear 365 along rack 301 between the fore and aft positions illustrated by comparing FIGS. 11 and 12.

The seat and seat supporting structure 311 are vertically raised and lowered by a single movement mechanism (as compared to the dual sector gear mechanism of the preferred embodiment) by operably rotating jackscrew 339. Jackscrew 339 is rotated when electric motor 81 linearly moves the spur gear to engage within first bevel gear 381, thereby driving second bevel gear 353 and flexible cable 351. Similarly, the seat and seat supporting structure 311 are tilted fore and aft by rotating obliquely angled jackscrew 357. Jackscrew 357 is actuated when the electric motor 81 linearly moves the spur gear to engagably drive another first bevel gear 383, which in turn, rotatably drives second bevel gear 361 and flexible cable 359. The tilting action of jackscrew 357 can be observed by comparing FIGS. 12 and 13. A slave scissor linkage is disposed on the opposite side of seat.

While various embodiments of this multi-functional apparatus have been disclosed, it will be appreciated that other modifications may be made without departing from the present invention. For example, alternate solenoid or electromagnet constructions may be used in place of the previously described electric motor and brush arrangement, especially for the scissor linkage mechanism. Furthermore, additional spur gears, pinion gears, sector gears, planetary gears, jackscrews, sprockets and chains, pulleys and belts, cables or other force transmitting means may be employed to couple between the electromagnetic device and movement mechanisms. It will further be appreciated that a variety of other multiplexed or non-multiplexed, microprocessor or analog circuitry may be used to automatically control the apparatus of the present invention. The coupling and mechanical engagement function can also be carried out with a variety of other intermittent motion mechanism constructions such as Geneva mechanisms, Starwheel mechanisms, split shaft clutches, intermittent gearing, escapements, ratchet mechanisms or other known selectively actuable devices. Moreover, the seat supporting structure can be any skeletal device which moves with the seat bottom. While various materials, electronic components, circuits and force transmitting members have been disclosed, a variety of other such materials, electronic components, circuits and force transmitting devices may be used. It is intended by the following claims to cover these and any departures from the disclosed embodiments which fall within the true spirit of this invention.

What is claimed is:

1. A multi-functional apparatus for use with a seat, said apparatus comprising:

seat supporting structure;

a first movement mechanism operably moving at least a first portion of said structure in substantially fore and aft directions;

a second movement mechanism operably moving at least one of said first portion and a second portion of said structure in substantially up and down directions;

an electric motor having an output; and at least one mechanical engagement member connected to said motor output whereby said electric motor is selectively operable to move said mechanical engagement member linearly between a first position coupling said mechanical engagement member to said first movement mechanism and a second position coupling said mechanical engagement member to said second movement mechanism, said electric motor being selectively operable to rotate said mechanical engagement member in opposite directions causing said first and second movement mechanisms to operably move said structure in associated ones of said fore and aft directions and said up and down directions.

2. The apparatus of claim 1 including a third movement mechanism operably moving at least one of said first portion and a third portion of said structure in substantially up and down directions, said electric motor being selectively operable to move said mechanical engagement member linearly to a third position spaced from said first and second positions and coupling said mechanical engagement member to said third movement mechanism, said electric motor being selectively operable to rotate said mechanical engagement member in opposite directions causing said third movement mechanism to operably move said structure in said up and down directions.

3. The apparatus of claim 2 wherein said second and third movement mechanisms operably move a front portion and a rear portion respectively of said structure in a tilting manner.

4. The apparatus of claim 1 wherein said second movement mechanism is a scissor-type linkage actuated by a jackscrew coupled to said mechanical engagement member.

5. The apparatus of claim 1 wherein said electric motor output includes an armature shaft and said first and second positions are spaced a predetermined distance apart, said first and second movement mechanisms being spaced apart said predetermined distance.

6. The apparatus of claim 5 wherein said electric motor includes a motor housing, an armature attached to said armature shaft and operably rotating in said motor housing, and more than two brushes in electrical connection with said armature, at least a pair of said brushes operably causing said armature shaft to linearly move relative to said motor housing when connected to a source of electrical power.

7. The apparatus of claim 1 wherein said electric motor output includes an armature shaft, said mechanical engagement member includes a portion of said armature shaft having a spur gear mounted thereon, and said first and second movement mechanisms each include a separate bevel gear, said bevel gears being internally splined for engagement with said spur gear.

8. The apparatus of claim 1 including an electronic control unit selectively causing said electric motor to linearly move said mechanical engagement member between said first and second positions.

9. A multi-functional apparatus for use with a seat, said apparatus comprising:

seat supporting structure having a front portion and a rear portion;

a first movement mechanism operably moving said structure in substantially fore and aft directions;

a second movement mechanism operably moving said front portion of said structure in substantially up and down directions;

a third movement mechanism operably moving said rear portion of said structure in substantially up and down directions;

an electric motor having an armature shaft; and at least one mechanical engagement member including a portion of said armature shaft whereby said electric motor is selectively operable to move said mechanical engagement member linearly among a first position coupling said mechanical engagement member to said first movement mechanism, a second position coupling said mechanical engagement member to said second movement mechanism, and a third position coupling said mechanical engagement member to said third movement mechanism, said electric motor being selectively operable to rotate said mechanical engagement member in opposite directions causing said first, second and third movement mechanisms to operably move said structure in associated ones of said fore and aft directions and said up and down directions.

10. The apparatus of claim 9 wherein said second and third movement mechanisms operably move said front portion and said rear portion respectively in a tilting manner.

* * * * *